(12) United States Patent
Wang

(10) Patent No.: US 9,475,646 B2
(45) Date of Patent: Oct. 25, 2016

(54) LAMINATED CHIP WRITING DEVICE

(71) Applicant: Guangzhou Mingsen Mech. & Elec. Equipment Co., Ltd., Guangzhou (CN)

(72) Inventor: Kailai Wang, Guangzhou (CN)

(73) Assignee: Guangzhou Mingsen Technologies Co., Ltd., Guangzhou (CN)

( * ) Notice: Subject to any disclaimer, the term of this patent is extended or adjusted under 35 U.S.C. 154(b) by 5 days.

(21) Appl. No.: 14/695,585

(22) Filed: Apr. 24, 2015

(65) Prior Publication Data
US 2016/0264359 A1    Sep. 15, 2016

(30) Foreign Application Priority Data

Mar. 14, 2015 (CN) .......................... 2015 1 0119212

(51) Int. Cl.
*B65G 23/24* (2006.01)

(52) U.S. Cl.
CPC ..................... *B65G 23/24* (2013.01)

(58) Field of Classification Search
CPC .................................................. B65G 23/24
USPC .................................. 198/339.1, 340, 345.1
See application file for complete search history.

(56) References Cited

FOREIGN PATENT DOCUMENTS

| CN | 104200254 A | * | 12/2014 |
| CN | 204028919 U | * | 12/2014 |
| CN | 204166560 U | * | 2/2015 |

* cited by examiner

*Primary Examiner* — Leslie A Nicholson, III
*Assistant Examiner* — Lester Rushin
(74) *Attorney, Agent, or Firm* — Osha Liang LLP

(57) ABSTRACT

A laminated chip writing device having a tower, a plurality of chip writing units arranged on the tower, and a driving mechanism for driving the tower and the chip writing units linearly. The plurality of chip writing units are arranged on the tower along an inclination direction having an angle between 0° and 90° in a horizontal direction. The two adjacent chip writing units are staggered on one another in the horizontal direction to form a staggered space. An arrangement direction of the chip writing units on the tower is parallel to the linear movement direction of the chip writing units. When any chip writing unit arrives at a card access position, the clearance in the chip writing unit and the staggered space under the clearance form a passage in which working dial teeth pushes a card.

8 Claims, 8 Drawing Sheets

LAMINATED CHIP WRITING DEVICE

FIELD OF THE INVENTION

The present invention relates to production equipment of smart cards, and particularly relates to a laminated chip writing device.

BACKGROUND OF THE INVENTION

In the production process of a smart card with a chip, information needs to be written into the chip, this operation is called as "chip writing", and the operation of chip writing is completed by chip writing equipment. The chip writing equipment generally includes a card issuing device, a card conveying line, a chip writing device and a card receiving device, wherein with reference to FIG. 1, the card conveying line is mainly composed of a card conveying track 11 and a card conveying mechanism, and a clamping groove for guiding and positioning a card 1 is formed in the card conveying track 11; the card conveying mechanism is generally in two forms of roller conveying and synchronous belt conveying, wherein the synchronous belt conveying form has wider application due to the advantages of high efficiency and high stability; and the card conveying mechanism is mainly composed of a synchronous conveying belt 2 and dial teeth 2-1 arranged on the synchronous conveying belt 2, and the dial teeth 2-1 push the card 1 to move in the clamping groove. The chip writing device mainly has a turntable type structure or a laminated structure.

In the turntable type structure, a plurality of chip writing units are arranged in the circumferential direction of a turntable, and each chip writing unit takes charge of the chip writing operation of a card; the turntable rotates intermittently during working, one of the chip writing units arrives at a position superposed with the card conveying line when the turntable rotates once, and the position is called as a "card access position"; and then the card conveying mechanism pushes out the card which has been subjected to card writing processing in the chip writing unit at the card access position, and conveys a new card into the chip writing unit, thus realizing continuous cycle operation.

See FIG. 2 and FIG. 3. In the laminated structure, a plurality of laminated chip writing units 4 are arranged in a linear distribution manner in the vertical direction, these chip writing units 4 move intermittently along the vertical direction during working, one of the chip writing units 4 arrives at a card access position 9 when moving once, and the synchronous conveying belt 2 pushes out the card 1 which has been subjected to card writing processing in the chip writing unit 4 at the card access position 9 and conveys a new card 1 into the chip writing unit 4, thus realizing continuous cycle operation. The synchronous conveying belt 2 moves circularly and gradually along an annular locus during working, the upper part of the synchronous conveying belt 2 is a working part. 2-2 actually pushing the card 1, the dial teeth 2-1 thereon are called as working dial teeth 2-11, and these working dial teeth 2-11 push the card 1 to gradually move in the card conveying track; and the lower part is a return part 2-3, and the dial teeth 2-1 thereon are called as return dial teeth 2-12.

See FIG. 2 and FIG. 3. In the laminated chip writing device, the working dial teeth 2-11 of the synchronous conveying belt 2 pass through the chip writing units 4 during working so that the card 1 can be pushed into or pushed out of the chip writing units 4, which requires that the clearance 4-1 in the vertical direction of each chip writing unit 4 must be higher than the dial teeth 2-1; meanwhile, it also requires that the position of the chip writing unit 4 arriving at the card access position 9 in the vertical direction must correspond to the positions of the working dial teeth 2-11 (namely the positions where the working dial teeth 2-11 can pass without collision) when the chip writing unit 4 moves once along the vertical direction; and to ensure that the return dial teeth 2-12 on the return part 2-3 at the lower part of the synchronous conveying belt 2 can also smoothly pass through the laminated chip writing device, it requires that the positions of the return dial teeth 2-12 in the height direction must correspond to the position of a certain chip writing unit 4 when the chip writing unit 4 moves once along the vertical direction, so that the return dial teeth 2-12 can also smoothly pass through the clearance 4-1 of the chip writing unit 4. In practical production, the laminated chip writing device has the following shortcomings:

1, it requires that the parameters including the height of the clearance 4-1 in each chip writing unit 4 in the laminated chip writing device, the distance between two chip writing units 4, the distance when each chip writing unit 4 moves once and the like must be set according to the vertical distance of the working dial teeth 2-11 and the return dial teeth 2-12 in the synchronous conveying belt 2, and when the synchronous conveying belt 2 stops, the laminated chip writing device must be positioned between two working dial teeth 2-11 and two return dial teeth 2-12, otherwise, collision easily happens, so that it is difficult in design, installation, debugging, control and other aspects; in practical production, the synchronous conveying belt 2 may be lengthened after being used for long time, so that when the synchronous conveying belt 2 stops, the stop positions of the return dial teeth 2-12 are changed, and the return dial teeth 2-12 collide with the chip writing unit 4.

2. Because the clearance 4-1 in each chip writing unit 4 must be higher than the dial teeth 2-1, the distance between the adjacent chip writing units 4 is difficult to further shorten, and the structure is incompact.

SUMMARY OF THE INVENTION

In one or more embodiments of the present invention, a laminated chip writing device is provided. When the laminated chip writing device works, dial teeth on a synchronous conveying belt can be effectively prevented from colliding with chip writing units, the adjacent chip writing units can be more compact, and there can be more chip writing units at a definite height, so that the production efficiency can be improved.

A laminated chip writing device includes a tower, a plurality of chip writing units arranged on the tower and a driving mechanism for driving the tower and the chip writing units thereon to move linearly;

in the plane perpendicular to the card dialing direction of a synchronous conveying belt in a card conveying line, the plurality of chip writing units are arranged on the tower at equal intervals along the inclination direction having an included angle of more than 0° and less than 90° with the horizontal direction; the two adjacent chip writing units are staggered with each other in the horizontal direction, and a staggered space is formed between the lower side of the upper chip writing unit and the outer side of the lower chip writing unit; card passages allowing a card to stop and pass in the chip writing units are parallel to each other and parallel to a card conveying track; the planes of the card passages in the chip writing units are parallel to each other and parallel to the plane of the card conveying track;

the arrangement direction of the chip writing units on the tower is parallel to the linear movement direction of the chip writing units; and when any chip writing unit arrives at a card access position, the card passage in the chip writing unit is aligned with the card conveying track, the clearance in the chip writing unit and the staggered space under the clearance form a passage in which working dial teeth on the synchronous conveying belt push the card to move.

In one or more embodiments of the present invention, each chip writing unit includes a clamping seat and chip writing assemblies arranged on the clamping seat; the clamping seat is composed of a top plate as well as a first side plate and a second side plate which are arranged on two sides of the top plate, wherein the card passages are oppositely formed on the inside surfaces of the first side plate and the second side plate; the outside surface of the second side plate is an inclined plane; the tower is composed of a flat plate, and the inclined plane is attached to and fixed together with the surface of the flat plate; and the surface of the flat plate is parallel to the direction of the chip writing units moving linearly along with the tower.

The above solution facilitates installation of the clamping seats. During installation, a plurality of clamping seats are arranged and fixed on the flat plate according to set intervals, and it is ensured that the clamping seats are parallel to each other; and then the flat plate is installed on a frame of the chip writing device, and it is ensured that the surface of the flat plate is parallel to the direction of the chip writing units moving linearly along with the tower.

Positioning grooves are formed at the positions where the surface of the flat plate is connected with the clamping seats, and these positioning grooves are parallel to each other and are arranged at equal intervals; and the inclined planes of the clamping seats are embedded into the positioning grooves and fixed with the flat plate. Through the positioning grooves, the clamping seats are positioned more accurately and installed more conveniently; and during installation, as long as the inclined planes of the clamping seats are embedded into the positioning grooves and fixed, the position relation between the chip writing units can be ensured.

In one or more embodiments of the present invention, one end of each dial tooth on the synchronous conveying belt is fixed on the synchronous conveying belt, and the other end of each dial tooth is outwards bent into an L shape along the direction perpendicular to the belt surface. The bent parts are the ones actually pushing a card. To ensure a certain distance between the synchronous conveying belt and the chip writing units and further improve the safety, the dial teeth are generally bent after extending out of the edge of the synchronous conveying belt for a certain distance along the belt surface.

In one or more embodiments of the present invention, the chip writing assemblies include contact chip writing assemblies and noncontact chip writing assemblies, wherein each contact chip writing assembly includes a card reader and a probe, and the card reader is connected with a chip on the card through the probe and a conducting wire; and each noncontact chip writing assembly includes a card reader and an antenna plate, wherein data transmission is realized between the card reader and the chip of the card through the antenna plate and a conducting wire, the card reader is connected with the antenna plate through the conducting wire, and data transmission is realized between the antenna plate and the chip of the card through electromagnetic induction.

In each contact chip writing assembly, data transmission is realized between the card reader and the chip on the card in a direct contact manner, the probe is in contact with the chip during working to write information, and the probe rises to separate from the chip when the card is switched; in each noncontact chip writing assembly, data transmission is realized between the card reader and the chip of the card in a noncontact manner, wherein transmission is realized between the card reader and the antenna plate through a conducting wire, and transmission is realized between the antenna plate and the chip in a wireless manner; and two kinds of chip writing assemblies are arranged in the same chip writing unit to process contact cards and noncontact cards.

In one or more embodiments of the present invention, the driving mechanism is composed of a motor, a lead screw, sliding blocks and a guide rail, wherein a main shaft of the motor is connected with the lead screw; the lead screw penetrates through the sliding blocks to form a lead screw transmission mechanism; the sliding blocks are matched on the guide rail to form a linear sliding mechanism, and the sliding direction of the linear sliding mechanism is parallel to the linear movement direction of the tower; the guide rail and the motor are fixed on the frame; and the tower is connected with the sliding blocks.

In the above solution, the motor drives the lead screw to rotate, so as to drive the sliding blocks to move linearly on the guide rail and then drive the tower to move linearly. The driving mechanism has the advantages of simple structure, high movement precision and the like.

Specifically, the sliding blocks are connected with the tower through a connecting block, a connecting groove sunken inwards and matched with the sliding blocks in shape is formed on the lateral surface connected with the sliding blocks in the connecting block, and the sliding blocks are embedded into the connecting groove and fixedly connected with the connecting block. Thus, the connection between the tower and the sliding blocks is facilitated, and a certain distance is formed between the tower and the sliding blocks to facilitate installation of the card reader in each chip writing assembly.

Specifically, there are two sliding blocks, which are favorable for improving the moving stability of the tower.

Specifically, the main shaft of the motor is connected with the lead screw through a universal joint, so that the main shaft of the motor and the lead screw may be arranged eccentrically, the requirement for the position precision between the motor and the lead screw is reduced, and the installation is facilitated.

Specifically, an upper mounting seat and a lower mounting seat are respectively arranged at the upper end and the lower end of the guide rail, wherein two ends of the lead screw are respectively connected to the upper mounting seat and the lower mounting seat through bearings; the universal joint is arranged in the lower mounting seat; and the motor is fixed in the lower mounting seat.

Compared with the prior art, embodiments of the present invention have one or more of the following beneficial effects:

1. The working dial teeth pass through the staggered space of the two adjacent chip writing units, and the clearance between the two adjacent chip writing units does not need to be greater than the height of the dial teeth, so that the distance between the two adjacent chip writing units may be set as short as possible; under the same height, more chip writing units may be arranged, so that the working efficiency is improved; meanwhile, the spaces in the vertical direction and the horizontal direction are simultaneously utilized by the chip writing units arranged obliquely, so that a longer arrangement path may be obtained under the equal height, and the quantity of the chip writing units may be increased favorably; and the more oblique the arrangement direction of the chip writing units is, the larger the quantity of the chip writing units is.

2. Because the chip writing units are arranged along the inclination direction and also move along the inclination direction during working, other chip writing units under the chip writing unit at the card access position, the working dial teeth and the return dial teeth do not have superposed movement loci, so that the dial teeth are radically prevented from colliding with the chip writing units during working, the production safety is improved, and the difficulty in design, installation, debugging, control and other aspects is greatly reduced.

BRIEF DESCRIPTION OF THE DRAWINGS

FIG. 2 and FIG. 3 are brief structural diagrams of an existing laminated chip writing device, wherein FIG. 2 is a front view, and FIG. 3 is a right view;

FIG. 5 and FIG. 6 are specific structural schematic diagrams of the first implementation of the laminated chip writing device of one or more embodiments of the present invention, wherein FIG. 5 is a front view, and FIG. 6 is a right view;

DETAILED DESCRIPTION OF THE EMBODIMENTS

Figure 1:
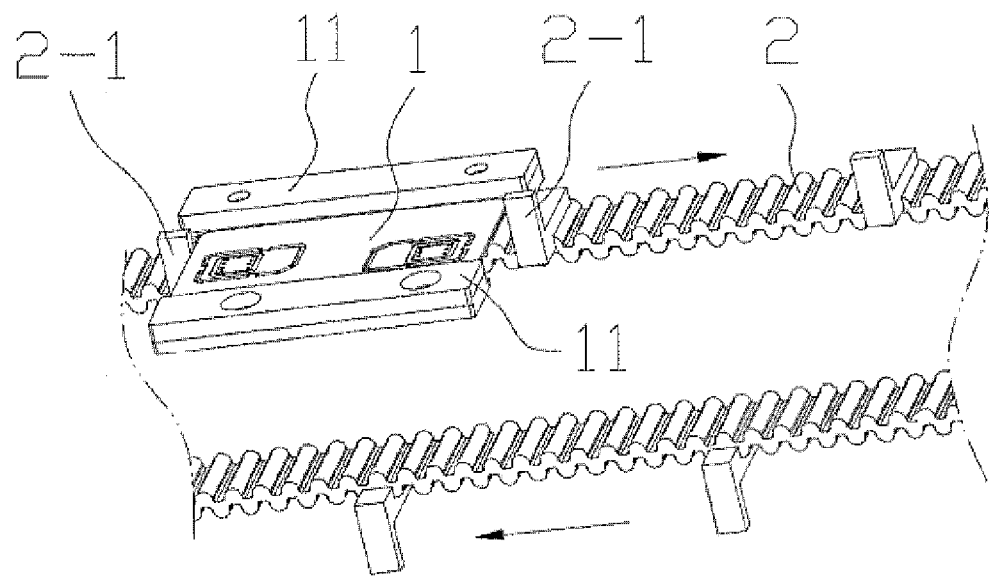
FIG. 1 is a schematic diagram of a local three-dimensional structure of a card conveying line in the prior art.
Figure 2:
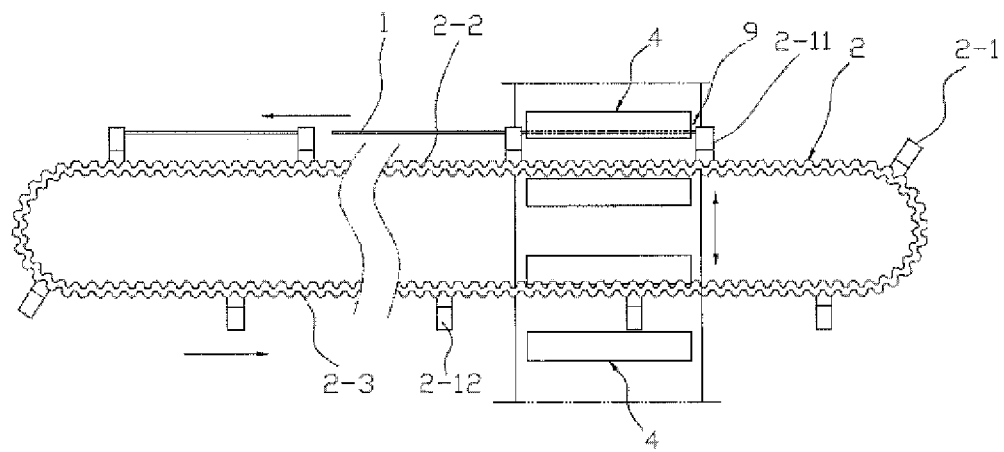
Figure 3:
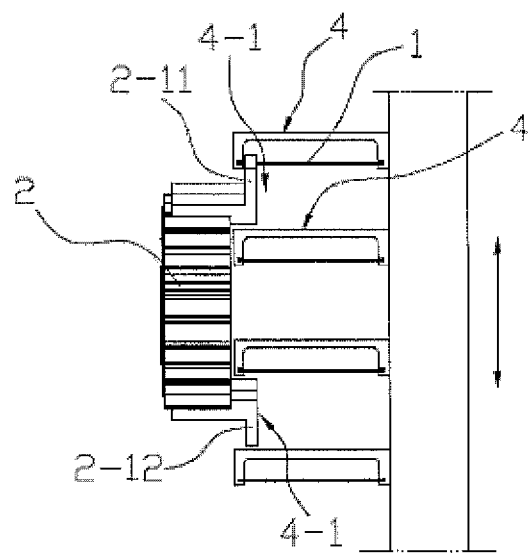
Figure 4:
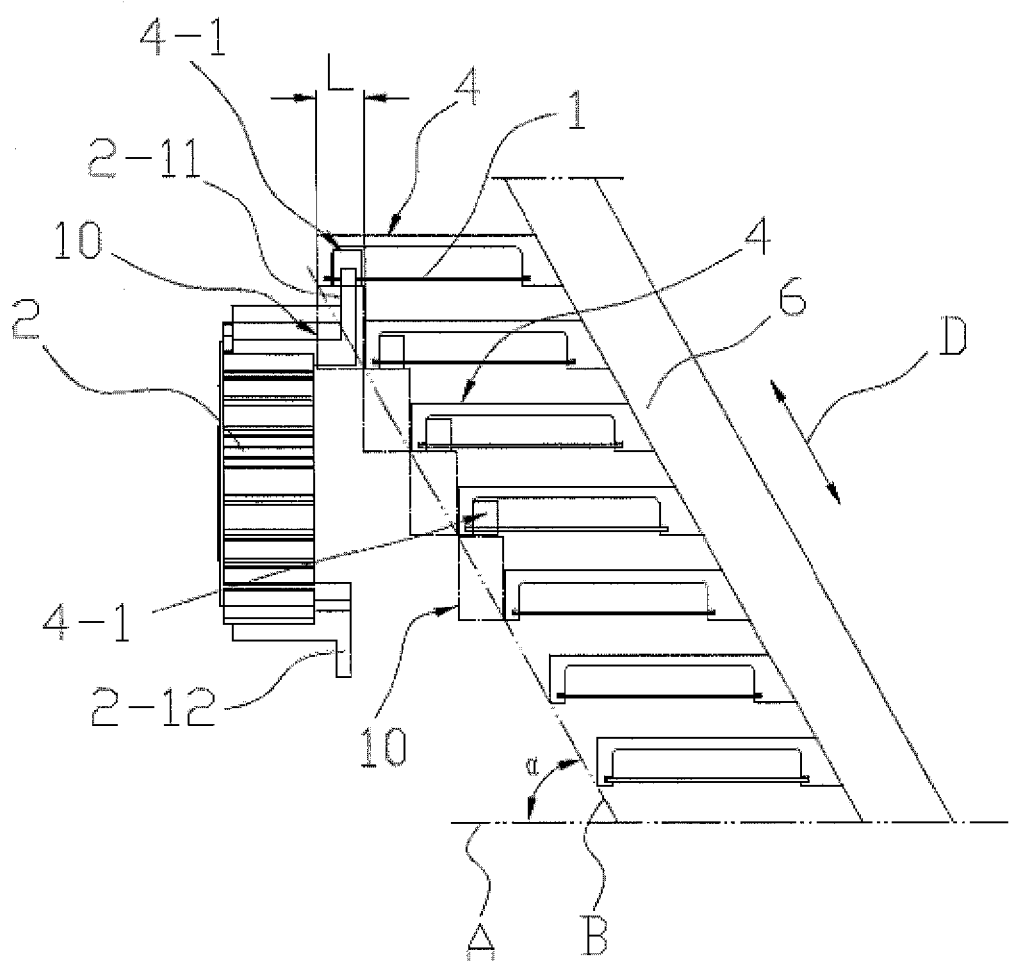
FIG. 4 is a brief structural diagram of a first specific implementation of a laminated chip writing device of one or more embodiments of the present invention.
Figure 5:
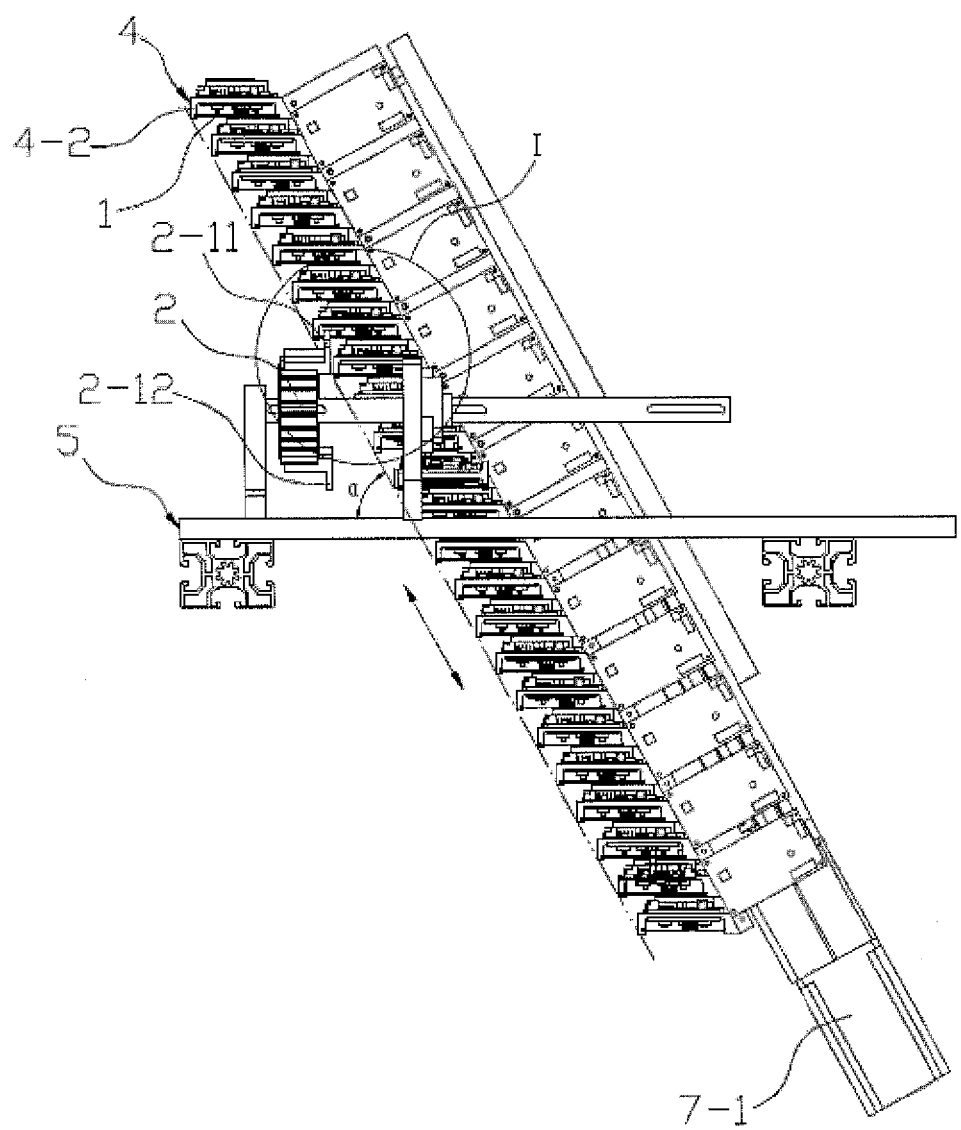
Figure 6:
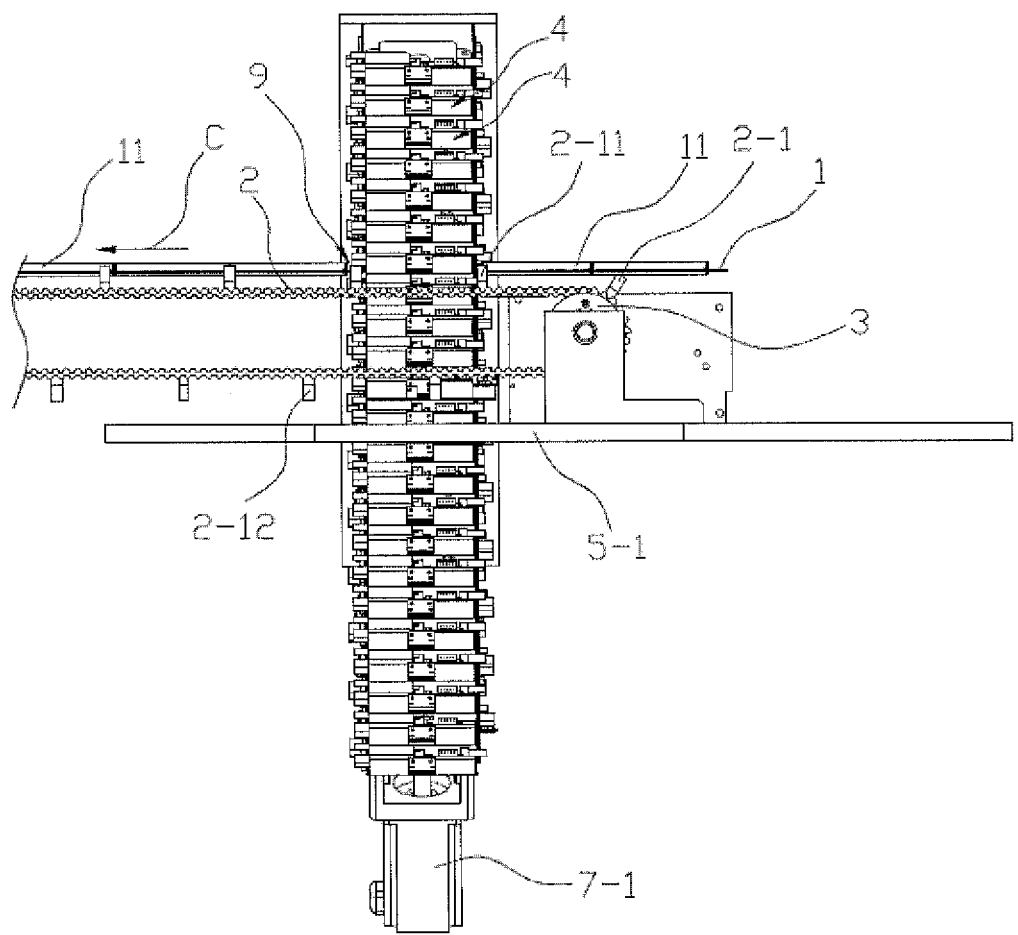
Figure 7:
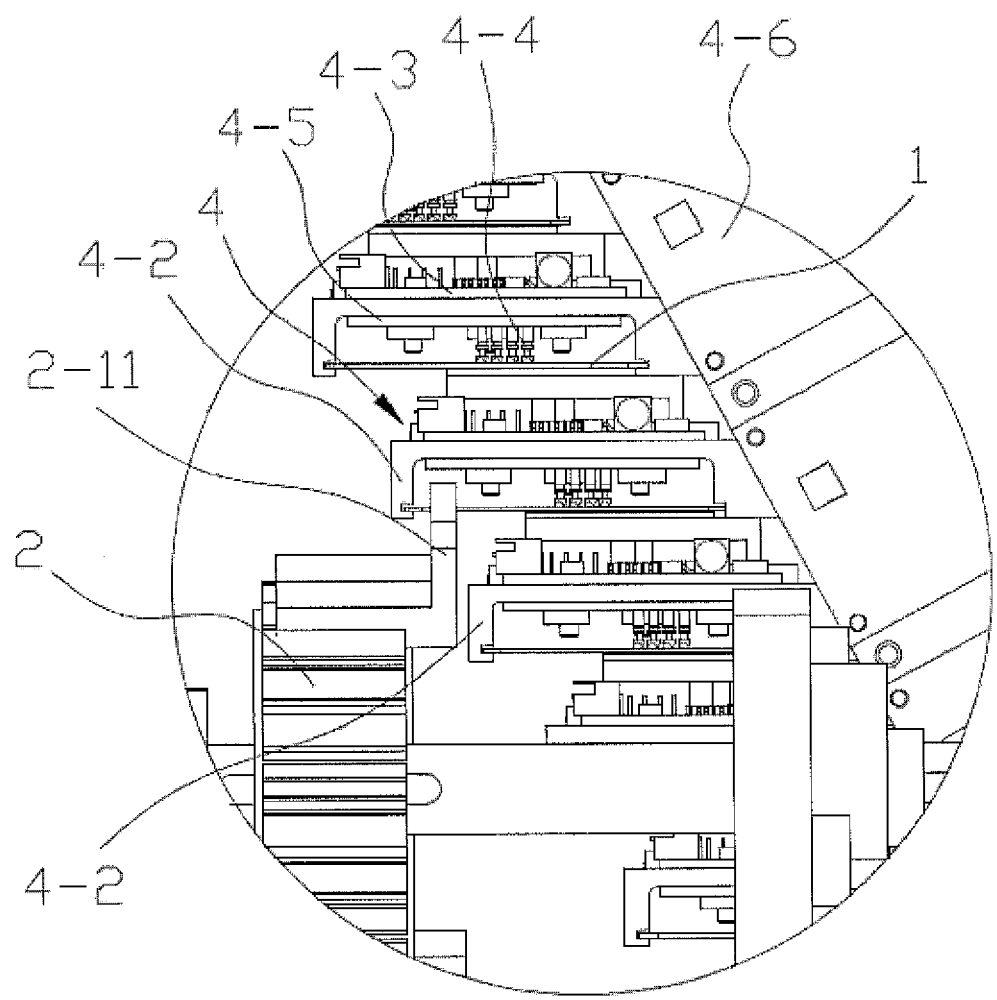
FIG. 7 is a local amplified diagram of I in FIG. 5.
Figure 8:
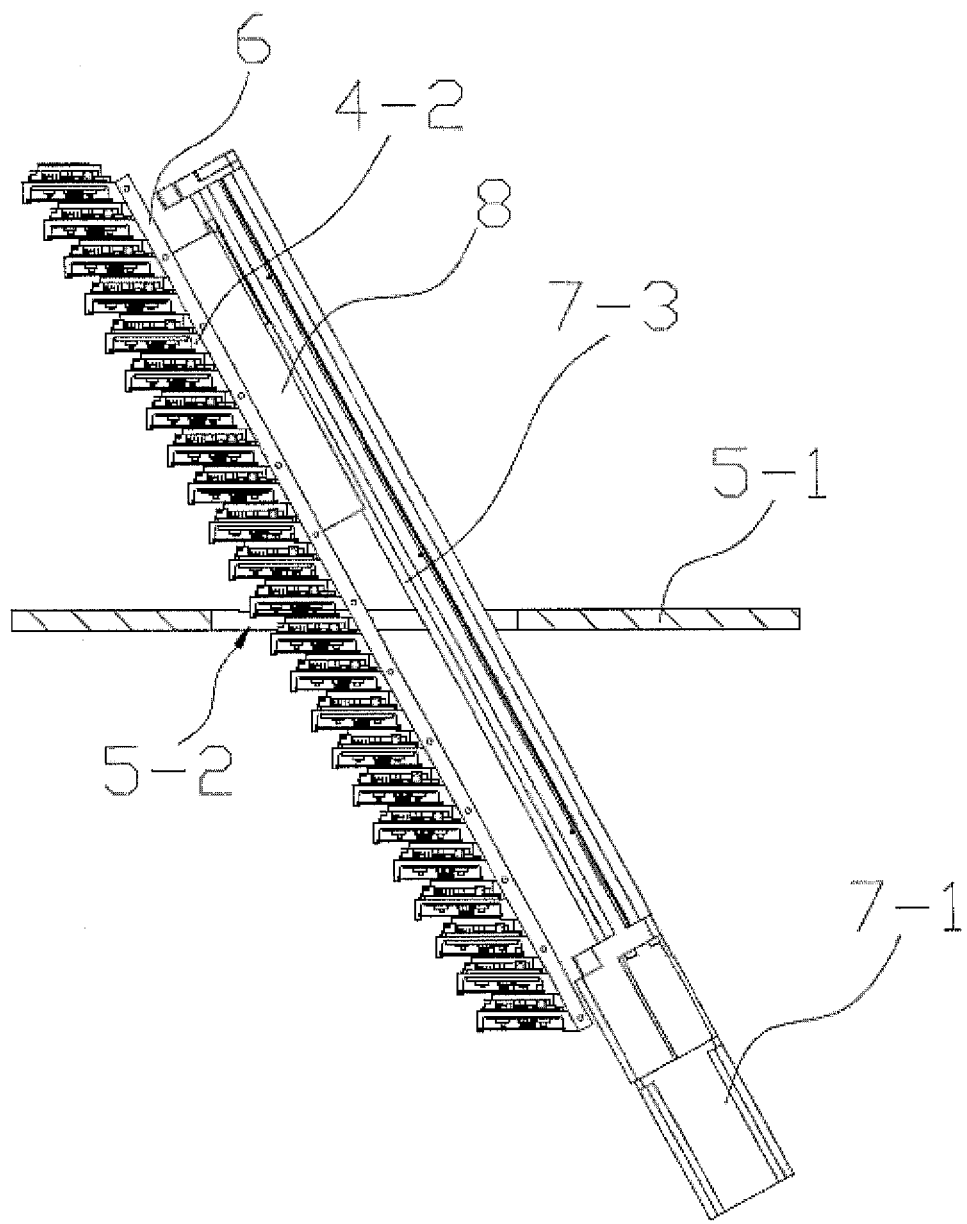
FIG. 8 is a simplified diagram of FIG. 5.
Figure 9:
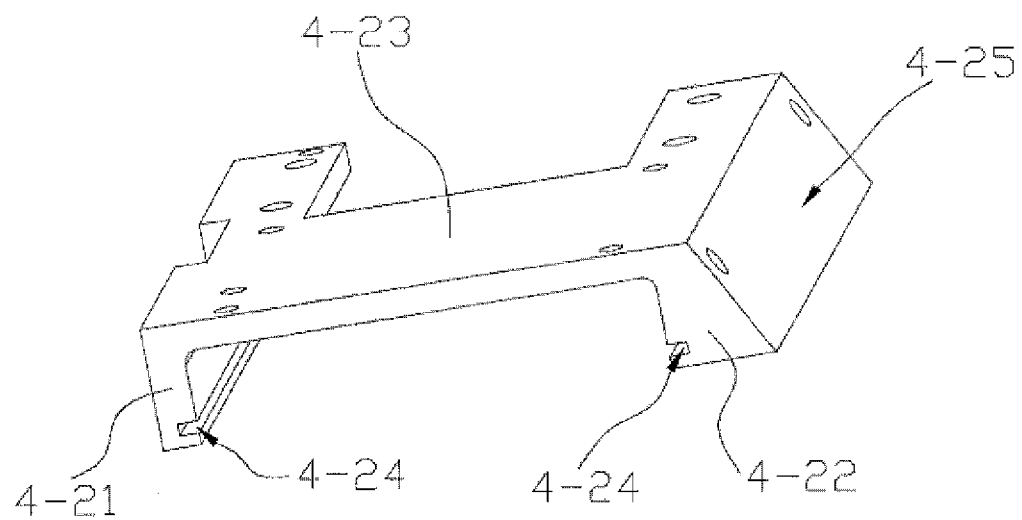
FIG. 9 is a schematic diagram of a three-dimensional structure of a clamping seat in the first specific implementation of the laminated chip writing device of one or more embodiments of the present invention.
Figure 10:
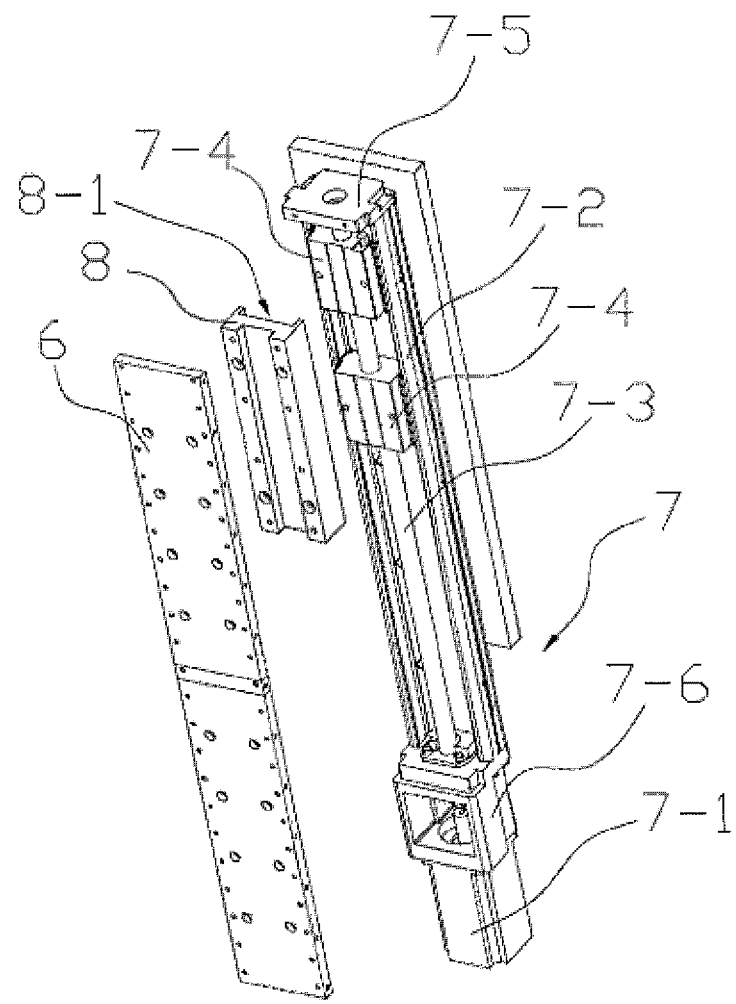
FIG. 10 is a structural diagram (explosive view) of a driving mechanism in the first specific implementation of the laminated chip writing device of one or more embodiments of the present invention.

The present invention will be further described in detail below in combination with embodiments and accompanying drawings, but the implementations of the present invention are not limited thereto.

Embodiment 1

See FIG. 4 to FIG. 8. A laminated chip writing device of one or more embodiments of the present invention is arranged on a card conveying track 11, and a synchronous conveying belt 2 is arranged in parallel to the card conveying track 11; working dial teeth 2-11 on the synchronous conveying belt 2 intermittently push a card 1 to move on the card conveying track 11, and the working dial teeth 2-11 push the card 1 to move for one step when moving once; and the laminated chip writing device of one or more embodiments of the present invention is arranged between two working dial teeth 2-11 in stop. A card access position 9 is formed at the intersection of the card conveying track 11 and the laminated chip writing device of one or more embodiments of the present invention, and the card 1 in the card conveying track 11 is exchanged with the card 1 in the laminated chip writing device at the card access position 9.

See FIG. 4 to FIG. 10. The laminated chip writing device of one or more embodiments of the present invention includes a tower 6, a plurality of chip writing units 4 arranged on the tower 6 and a driving mechanism 7 for driving the tower 6 and the chip writing units 4 thereon to move linearly.

See FIG. 4 to FIG. 8. In the plane perpendicular to the card dialing direction C of the synchronous conveying belt 2 in a card conveying line, the plurality of chip writing units 4 are arranged on the tower 6 at equal intervals along the inclination direction B having an included angle α of more than 0° and less than 90° with the horizontal direction A, and the included angle α is 60° in this embodiment. Because the chip writing units 4 are arranged obliquely, the two adjacent chip writing units 4 are staggered with each other in the horizontal direction A, and a staggered space 10 is formed between the lower side of the upper chip writing unit 4 and the outer side of the lower chip writing unit 4; the longer the staggered distance L between the chip writing units 4 is, the larger the obtained staggered space 10 is; and the smaller the included angle α is, the longer the staggered distance L between the chip writing units 4 is.

See FIG. 4 to FIG. 8. The arrangement direction of the chip writing units 4 on the tower 6 is parallel to the linear movement direction D of the chip writing units 4. Card passages 4-24 allowing the card 1 to stop and pass in the chip writing units 4 are parallel to each other and parallel to the card conveying track 11; the planes of the card passages 4-24 in the chip writing units 4 are parallel to each other and parallel to the plane of the card conveying track 11; and when a chip writing units 4 arrives at the card access position 9, the card passage 4-24 may be aligned with the card conveying track 11, so that the card 1 may smoothly transit between the chip writing unit 4 and the card conveying track 11.

See FIG. 4 to FIG. 8. When any chip writing unit 4 arrives at the card access position 9, the card passage 4-24 in the clamping seat 4-2 of the chip writing unit 4 is aligned with the card conveying track 11, and the clearance 4-1 in the chip writing unit 4 and the staggered space 10 under the clearance 4-1 form a passage in which the working dial teeth 2-11 on the synchronous conveying belt push the card 1 to move; and the working dial teeth 2-11 pass through the laminated chip writing device of one or more embodiments of the present invention from the passage during working, which requires that the staggered space 10 is wide enough for accommodating the working dial teeth 2-11, so that the working dial teeth 2-11 may smoothly pass without colliding with the chip writing unit 4.

See FIG. 4 to FIG. 9. Each chip writing unit 4 includes a clamping seat 4-2 and chip writing assemblies arranged on the clamping seat 4-2. The clamping seat 4-2 is composed of a top plate 4-23 as well as a first side plate 4-21 and a second side plate 4-22 which are arranged on two sides of the top plate 4-23, wherein card passages 4-24 are oppositely formed on the inside surfaces of the first side plate 4-21 and the second side plate 4-22. The outside surface of the second side plate 4-22 is an inclined plane 4-25 used for connection with the tower 6. The tower 6 is composed of a flat plate, and the inclined planes 4-25 are attached to and fixed together with the surface of the flat plate. The surface of the flat plate is parallel to the direction D of the chip writing units 4 moving linearly along with the tower 6. During installation, a plurality of clamping seats 4-2 are arranged on the flat plate according to set intervals, it is ensured that the clamping seats 4-2 are parallel to each other, and the inclined planes 4-25 are fixedly connected with the flat plate by screws; and then the flat plate is installed on a frame 5 of the chip writing device, and it is ensured that the surface of the flat plate is parallel to the direction D of the chip writing units 4 moving linearly along with the tower 6.

See FIG. 4 to FIG. 8. One end of each dial tooth 2-1 on the synchronous conveying belt 2 is fixed on the synchronous conveying belt 2, and the other end of each dial tooth 2-1 is outwards bent into an L shape along the direction perpendicular to the belt surface. The bent parts are the ones actually pushing the card 1. To ensure a certain distance between the synchronous conveying belt 2 and the chip writing units 4, the dial teeth 2-1 are generally bent after extending out of the edge of the synchronous conveying belt 2 for a certain distance along the belt surface.

See FIG. 4 to FIG. 8. The chip writing assemblies include contact chip writing assemblies and noncontact chip writing assemblies, wherein each contact chip writing assembly includes a card reader 4-3 and a probe 4-4, the card reader 4-3 is connected with a chip on the card 1 through the probe 4-4 and a conducting wire, the probe 4-4 is in contact with the chip during working to write information, and the probe 4-4 rises to separate from the chip when the card is switched; each noncontact chip writing assembly includes a card reader 4-6 and an antenna plate 4-5, wherein data transmission is realized between the card reader 4-6 and the chip of the card 1 through the antenna plate 4-5 and a conducting wire, the card reader 4-6 is connected with the antenna plate 4-5 through the conducting wire, and data transmission is realized between the antenna plate 4-5 and the chip of the card 1 through electromagnetic induction; and the probe 4-4 and the antenna plate 4-5 in each chip writing unit 4 are arranged on the clamping seat 4-2, and the card readers 4-3 and 4-6 may be installed on the clamping seat 4-2 or the tower 6 and move along with the chip writing unit 4 or arranged on the frame 5 nearby.

See FIG. 4 to FIG. 8 and FIG. 10. The driving mechanism 7 is composed of a motor 7-1, a lead screw 7-3, sliding blocks 7-4 and a guide rail 7-2, wherein a main shaft of the motor 7-1 is connected with the lead screw 7-3; the lead screw 7-3 penetrates through the sliding blocks 7-4 to form a lead screw transmission mechanism; the sliding blocks 7-4 are matched on the guide rail 7-2 to fond a linear sliding mechanism, and the sliding direction of the linear sliding mechanism is parallel to the linear movement direction of the tower 6; the guide rail 7-2 and the motor 7-1 are fixed on the frame 5; and the tower 6 is connected with the sliding blocks 7-4. The working process of the driving mechanism 7 is as follows: the motor 7-1 drives the lead screw 7-3 to rotate, so as to drive the sliding blocks 7-4 to move linearly on the guide rail 7-2 and then drive the tower 6 to move linearly. The driving mechanism 7 has the advantages of simple structure, high movement precision and the like. The sliding blocks 7-4 are connected with the tower 6 through a connecting block 8, a connecting groove 8-1 sunken inwards and matched with the sliding blocks 7-4 in shape is formed on the lateral surface connected with the sliding blocks 7-4 in the connecting block 8, and the sliding blocks 7-4 are embedded into the connecting groove 8-1 and fixedly connected with the connecting block 8, so that the connection between the tower 6 and the sliding blocks 7-4 is facilitated, and a certain distance is formed between the tower 6 and the sliding blocks 7-4 to facilitate installation of the card reader 4-6 in the chip writing assembly 4-2. There are two sliding blocks 7-4, which are favorable for improving the moving stability of the tower 6. The main shaft of the motor 7-1 is connected with the lead screw 7-3 through a universal joint, so that the main shaft of the motor 7-1 and the lead screw 7-3 may be arranged eccentrically, the requirement for the position precision between the motor 7-1 and the lead screw 7-3 is reduced, and the installation is facilitated. An upper mounting seat 7-5 and a lower mounting seat 7-6 are respectively arranged at the upper end and the lower end of the guide rail 7-2, wherein two ends of the lead screw 7-3 are respectively connected to the upper mounting seat 7-5 and the lower mounting seat 7-6 through bearings; the universal joint is arranged in the lower mounting seat 7-6; and the motor 7-1 is fixed in the lower mounting seat 7-6.

See FIG. 4 to FIG. 8. The laminated chip writing device of one or more embodiments of the present invention is arranged on the frame 5, the frame 5 includes a mounting plate 5-1, and the mounting plate 5-1 is provided with a through hole 5-2 through which the laminated chip writing device penetrates. A synchronous wheel 3 is arranged at each of two ends of the synchronous conveying belt 2, and a power mechanism is arranged on one of the synchronous wheels 3.

See FIG. 4 to FIG. 10. The working principle of one or more embodiments of the present invention will be described in detail below in combination with the accompanying drawings: the driving mechanism drives the tower 6 and the chip writing units 4 thereon to move intermittently and linearly, and the chip writing units 4 sequentially move to the card access position 9; when any chip writing unit 4 arrives at the card access position 9, the working dial teeth 2-11 in the synchronous conveying belt 2 move for one step, to push the card 1 which has been subjected to chip writing operation in the chip writing unit 4 at the card access position 9 out to the card conveying track 11, and convey another new card 1 into the card passage 4-24 of the chip writing unit 4 from the card conveying track 11; then the driving mechanism drives the next chip writing unit 4 to move to the card access position 9; and the operations are repeated in this way.

In the plane perpendicular to the card dialing direction C of the synchronous conveying belt 2 in the card conveying line, the plurality of chip writing units 4 are arranged on the tower 6 at equal intervals along the inclination direction B having an included angle α of more than 0° and less than 90° with the horizontal direction A, the arrangement direction of the chip writing units 4 on the tower 6 is parallel to the linear movement direction D of the chip writing units 4, and in the process that the chip writing units 4 move linearly along with the tower 6, the position of the latter chip writing unit 4 is superposed with the original position of the former chip writing unit 4 when moving once, so as to ensure that each chip writing unit 4 may accurately arrive at the card access position 9 and is matched with the card conveying track 11 and the working dial teeth 2-11 to push in and push out the card 1.

Moreover, in the plane perpendicular to the card dialing direction C of the synchronous conveying belt 2 in the card conveying line, the plurality of chip writing units 4 are arranged on the tower 6 at equal intervals along the inclination direction B having an included angle α of more than 0° and less than 90° with the horizontal direction A, so that the two adjacent chip writing units 4 are staggered with each other in the horizontal direction, and a staggered space 10 is formed between the lower side of the upper chip writing unit 4 and the outer side of the lower chip writing unit 4; the staggered space 10 and the clearance 4-1 in the upper chip writing unit 4 are combined together to form a moving passage used when the working dial teeth 2-11 push the card 1 to move, so that the working dial teeth 2-11 do not collide with the lower chip writing unit 4 in the card dialing process; the movement locus of any part in the chip writing unit 4 is not superposed with the movement locus of the return dial teeth 2-12, so that the return dial teeth 2-12 also do not collide with the chip writing unit 4; moreover, the working dial teeth 2-11 pass through the staggered space 10, so that the clearance 4-1 between the two adjacent chip writing units 4 does not need to be higher than the working dial teeth 2-11, the distance between the adjacent chip writing units 4 may be set as short as possible, and the structure may be more compact; and under the same height, more chip writing units 4 may be arranged, so that the working efficiency is higher.

Embodiment 2

Figure 11:
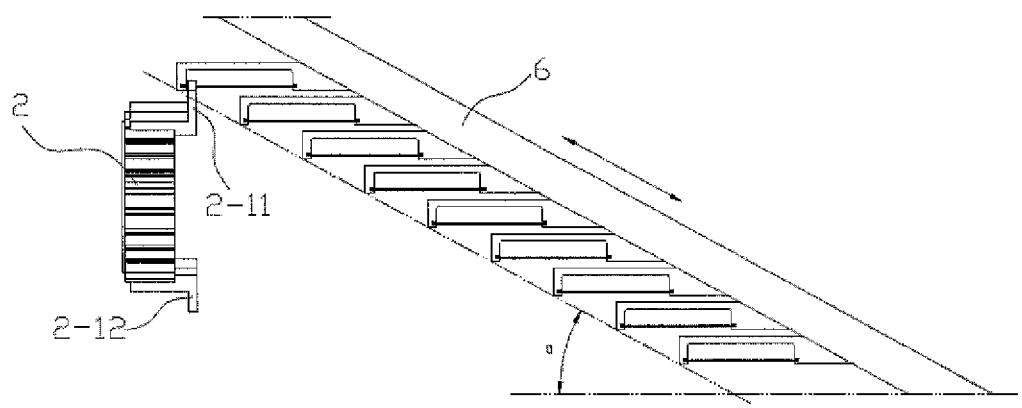
FIG. 11 is a brief structural diagram of a second specific implementation of the laminated chip writing device of one or more embodiments of the present invention.

See FIG. 11. Compared with embodiment 1, the plurality of chip writing units 4 are arranged on the tower 6 at equal intervals along the inclination direction B having an included angle α of 30° with the horizontal direction A in this embodiment. It could be known by comparison of FIG. 11 and FIG. 4 that, in this embodiment, because the included angle α is reduced, the quantity of the chip writing units 4 may be increased under the same height.

Other implementations of this embodiment are the same as those of embodiment 1.

Embodiment 3

Figure 12:
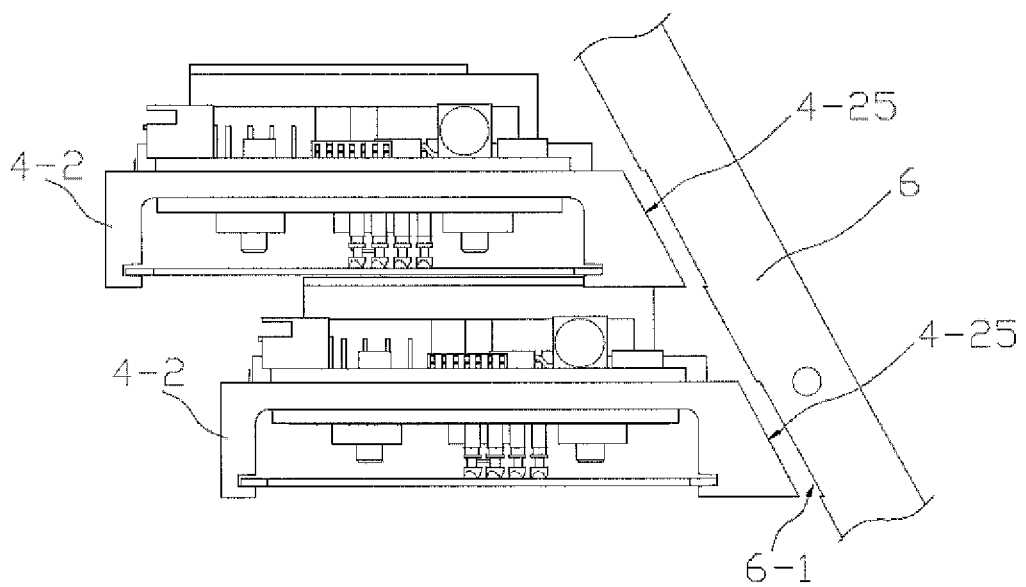
FIG. 12 is a brief structural diagram of a third specific implementation of the laminated chip writing device of one or more embodiments of the present invention.

See FIG. 12. In this embodiment, positioning grooves 6-1 are formed at the positions where the surface of the flat plate is connected with the clamping seats 4-2, these positioning grooves 6-1 are parallel to each other and are arranged at equal intervals, and the inclined planes 4-25 of the clamping seats 4-2 are embedded into the positioning grooves 6-1 and fixed with the flat plate. Through the positioning grooves 6-1, the clamping seats 4-2 are positioned more accurately and installed more conveniently; and during installation, as long as the inclined planes 4-25 of the clamping seats 4-2 are embedded into the positioning grooves 6-1 and fixed, the position relation between the chip writing units 4 can be ensured.

Other implementations of this embodiment are the same as those of embodiment 1.

While the disclosure has been described with respect to a limited number of embodiments, those skilled in the art, having benefit of this disclosure, will appreciate that other embodiments can be devised which do not depart from the scope of the disclosure as disclosed herein.

Furthermore, one of ordinary skill in the art would appreciate that certain "components," "units," "parts," "elements," or "portions" of one or more embodiments of the present disclosure may be implemented by a circuit, processor, etc., using any known methods. Accordingly, the scope of the disclosure should be limited only by the attached claims.

The invention claimed is:

1. A laminated chip writing device comprising:
a tower;
a plurality of chip writing units arranged on the tower; and
a driving mechanism for driving the tower and the chip writing units thereon linearly,
wherein, in the plane perpendicular to a card dialing direction of a synchronous conveying belt in a card conveying line, the plurality of chip writing units are arranged on the tower at equal intervals along an inclination direction having an angle between 0° and 90°, with respect to a horizontal direction,
wherein two adjacent chip writing units of the chip writing units are staggered with one another in the horizontal direction, and a staggered space is formed between a lower side of an upper chip writing unit of the two adjacent chip writing units and an outer side of a lower chip writing unit of the two adjacent chip writing units,
wherein card passages allowing a card to stop and pass in the plurality of chip writing units are parallel to each other and are parallel to a card conveying track,
wherein planes of the card passages in the plurality of chip writing units are parallel to each other and are parallel to a plane of the card conveying track,
wherein an arrangement direction of the plurality of chip writing units on the tower is parallel to a linear movement direction of the plurality of chip writing units, and
wherein, when any of the plurality of chip writing unit arrives at a card access position, the card passage in the chip writing unit is aligned with the card conveying track, the clearance in the chip writing unit, and the staggered space under the clearance that forms a passage in which working dial teeth on the synchronous conveying belt pushes the card.

2. The laminated chip writing device of claim 1, wherein:
each chip writing unit comprises a clamping seat and chip writing assemblies arranged on the clamping seat,
the clamping seat comprises a top plate as well as a first side plate and a second side plate, which are arranged on two sides of the top plate,
the card passages are oppositely formed on the inside surfaces of the first side plate and the second side plate,
the outside surface of the second side plate is an inclined plane,
the tower comprises a flat plate,
the inclined plane is attached to and fixed together with the surface of the flat plate, and
the surface of the flat plate is parallel to the direction of the chip writing units moving linearly along with the tower.

3. The laminated chip writing device of claim 2, wherein:
positioning grooves are formed at the positions where the surface of the flat plate is connected with the clamping seats,
the positioning grooves are parallel to each other and are arranged at equal intervals, and
the inclined planes of the clamping seats are embedded into the positioning grooves and fixed with the flat plate.

4. The laminated chip writing device of claim 1, wherein:
one end of each dial tooth on the synchronous conveying belt is fixed on the synchronous conveying belt, and
the other end of each dial tooth is bent outwardly into an L shape along the direction perpendicular to the belt surface.

5. The laminated chip writing device of claim 2, wherein:
the chip writing assemblies comprise contact chip writing assemblies and noncontact chip writing assemblies, each contact chip writing assembly comprises a card reader and a probe, and the card reader is connected with a chip on the card through the probe and a conducting wire, each noncontact chip writing assembly comprises a card reader and an antenna plate, data transmission is realized between the card reader and the chip of the card through the antenna plate and a conducting wire, the card reader is connected with the antenna plate through the conducting wire, and data transmission is realized between the antenna plate and the chip of the card through electromagnetic induction.

6. The laminated chip writing device of claim 2, wherein:

one end of each dial tooth on the synchronous conveying belt is fixed on the synchronous conveying belt, and the other end of each dial tooth is bent outwardly into an L shape along the direction perpendicular to the belt surface.

7. The laminated chip writing device of claim 3, wherein:

one end of each dial tooth on the synchronous conveying belt is fixed on the synchronous conveying belt, and the other end of each dial tooth is bent outwardly into an L shape along the direction perpendicular to the belt surface.

8. The laminated chip writing device of claim 3, wherein:

the chip writing assemblies comprise contact chip writing assemblies and noncontact chip writing assemblies, each contact chip writing assembly comprises a card reader and a probe, and the card reader is connected with a chip on the card through the probe and a conducting wire, each noncontact chip writing assembly comprises a card reader and an antenna plate, data transmission is realized between the card reader and the chip of the card through the antenna plate and a conducting wire, the card reader is connected with the antenna plate through the conducting wire, and data transmission is realized between the antenna plate and the chip of the card through electromagnetic induction.

* * * * *